Sept. 28, 1965          W. B. NOLAND          3,208,715
           LEAK LIMITING VALVE ASSEMBLY
                Filed June 21, 1963
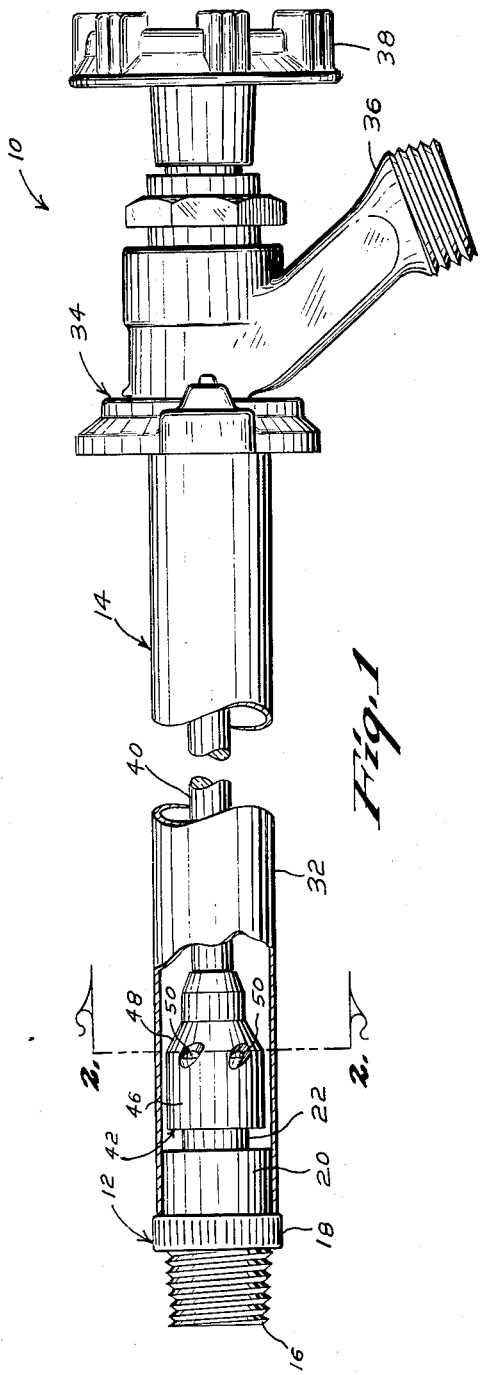
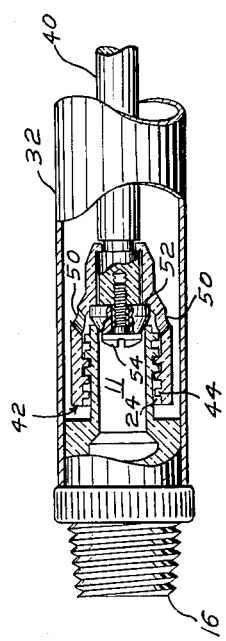
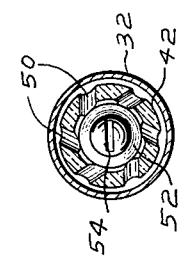
INVENTOR.
WAYNE B. NOLAND
BY
Dick, Zarley + Henderson
ATTORNEYS

3,208,715
LEAK LIMITING VALVE ASSEMBLY
Wayne B. Noland, Avon Lake, Iowa, assignor to Woodford Manufacturing Company, Des Moines, Iowa, a corporation of Iowa
Filed June 21, 1963, Ser. No. 289,522
5 Claims. (Cl. 251—12)

This invention relates to a valve assembly and in particular to the closure structure engageable with the seat portion of the inlet conduit or pipe.

In the conventional valve structure an inlet pipe has a seat end portion which is adapted to be engaged by a washer positioned on one end of a valve stem. A wheel handle is provided on the other end of the valve stem which upon being rotated will cause the washer to move into and away from the engagement with the seat end portion of the inlet pipe thereby opening and closing the valve assembly. In these valves it has been difficult to hold the washer in sealing engagement with the valve seat portion. Once the seal is broken and leakage occurs the forces of the fluid on the washer and valve stem tend to open the valve even further thereby permitting even greater leakage. The pressure of the water on the washer and valve stem is particularly effective in opening the valve if the packing around the valve stem is loose. Another factor that influences the tendency of the valve to open is the pitch of the threads on the valve stem. If the pitch is large, the valve stem need only rotate a fraction of a turn to provide a large space between the washer and the valve seat end portion of the inlet pipe. A valve of this type is a "fast" valve and once leakage begins it is probable that it will increase in a short time depending of course on the tightness of the packing and the inlet pressure.

Therefore it is an object of this invention to provide a valve assembly that will tend to close itself when partially opened.

It is a further object of this invention to provide a valve assembly which utilizes leaking fluid to help close the valve and stop the leakage.

It is a further object of this invention to provide a valve assembly wherein leaking fluid produces a reverse thrust which is applied to the washer housing to cause it to rotate into engagement with the inlet seat ends thereby closing the valve.

A further object of this invention is to provide a stop leak valve assembly which is simple in design, economical to manufacture and refined in appearance.

These and other objects, and other features and advantages of this invention will become readily apparent upon reference to the following description when taken in conjunction with the accompanying drawings, wherein:

FIG. 1 is a fragmentary side elevation view of the valve assembly with a portion of the outlet pipe broken away to illustrate the valve stem and washer housing, and the connection between the inlet pipe and the outlet pipe;

FIG. 2 is a cross-sectional view of the washer housing taken along line 2—2 in FIG. 1 and in particular shows the jet openings in the washer housing; and FIG. 3 is a fragmentary side elevation view of the inlet and outlet pipes with a portion thereof broken away to illustrate in cross-section the washer housing, washer and jet openings and seat portion of the inlet pipe.

The valve of this invention is referred to in FIG. 1 of the drawings by the reference numeral 10. As shown in FIG. 1, the valve 10 is in the form of a hydrant comprising an inlet pipe or conduit 12 and an outlet pipe or conduit 14.

The inlet pipe 12 has a passageway 11 (FIG. 3) extending through it and is provided at one end with a tapered tap portion 16 which is adapted to be screwed into a pipe which in turn is in communication with a water supply or the like. A shoulder 18 is disposed intermediate the tap 16 and a shank portion 20. The shank portion 20 has a relatively smaller diameter than the shoulder 18 and is integral with an end seat portion 22 having an even smaller diameter which is provided with external threads 24 (FIG. 3). The entire inlet pipe will ordinarily be integral and formed from any material such as brass.

The outlet pipe or conduit 14 contains means to close off the passageway 11 through the inlet pipe 12 at the outer end of the seat portion 22. In addition to this means which will be described below, the pipe 14 comprises a pipe 32 (FIG. 1) which is telescoped at one end over the shank portion 20 into abutting engagement against the shoulder 18. The other end of the pipe 32 is provided with a spout assembly 34 which comprises an outlet head 36 and a wheel handle 38. A valve stem 40 extends within the pipe 32 and is connected at one end of the wheel handle 38. An internally threaded socket housing member 42 is fixedly secured to the other end of the stem 40. Threads 44 in the socket member are adapted to matingly engage the external threads 24 formed on the seat portions 22 of the inlet pipe 12. In the wall of the socket member adjacent the bottom of the chamber are formed a plurality of uniformly spaced jet openings 50.

The wall of the socket housing member is comprised of two portions, an outer cylindrical portion 46 and an inwardly tapering portion 48. At the juncture of these two portions jet openings 50 extend through the wall in uniform spaced relationship around the socket housing member. As can be seen in FIG. 1, the openings 50 extend generally longitudinally of the socket member but at an angle of approximately 30 to 45 degrees to its longitudinal axis. And as shown in FIG. 2, the openings 50 extend at an angle of approximately 10 to 25 degrees to corresponding radial lines radiating from the longitudinal axis of the socket member.

In the very bottom of the socket housing member chamber is a rubber or synthetic washer 52 held therein by a screw 54. The washer 52 is of a conventional design having a convex outer face.

Thus it is seen that in operation, the valve 10 is opened and closed by moving the washer 52 into and out of engagement with the end of the seat portion 22 of the inlet pipe 12. This of course is accomplished by operation of the wheel handle 38 which will move the socket member 42, carrying the washer 52 towards and away from the seat portion 22 on the outlet end of the inlet pipe 12. When the valve is opened, water or the like flows into the passageway 11 through the tap end 16 of the inlet conduit 12 and out through the outer end of the seat portion 22 into the chamber of the socket member 42. From the chamber of the socket member 42 the water will flow through the jet openings 50 into the outlet pipe 32 and thence out the outlet head 36 in the spout assembly 34.

Because the jet openings 50 are positioned at the angle described with respect to the socket housing member 42, the flow of fluid outwardly therefrom will produce a reverse thrust which will be applied to the socket member thereby causing it to rotate. As the openings 50 are shown in the drawings and described, the fluid will impart a clockwise rotation to the socket member (counter-clockwise in FIG. 2) and consequently advance the washer 52 towards and into engagement with the seat portion 22 thereby tending to close the valve and minimizing the outflow of liquid. It is to be understood of course that the reverse thrust applied to the socket member is directly a function of the water pressure in the openings 50 which will be a function of the inlet 12 water pressure and the amount of water that escapes between the threads 24 and 44 into the pipe 32. Additionally the frictional resistance in the packing around the valve stem 40 will be influential. Furthermore, the "faster" the threads or the greater the pitch between threads the better suited the valve is to function in a self closing manner.

Some changes may be made in the construction and arrangement of my leak limiting valve assembly without departing from the real spirit and purpose of my invention, and it is my intention to cover by my claims, any modified forms of structure or use of mechanical equivalents which may be reasonably included within their scope.

I claim:
1. In a valve assembly, comprising,
an inlet pipe having its outlet end externally threaded;
an outlet pipe, said outlet end of said inlet pipe disposed in one end of said outlet pipe;
a valve stem extending axially of said outlet pipe; and
an internally threaded socket member provided on one end of said valve stem, said socket member adapted to threadably engage said threaded end of said inlet pipe, the wall of said socket member being provided with a plurality of jet openings communicating with said outlet pipe, each of said openings having a longitudinal axis disposed in a plane spaced outwardly from the longitudinal axis of said socket member, the transverse projection of the axis of each opening being a line spaced from the longitudinal axis of the socket member, said openings being so arranged that the resulting thrust from water flowing through said jet openings will produce a reverse circumferential thrust on said socket member causing it to rotate and the direction of said reverse thrust and rotation being the same as the direction in which the socket member is turned to close the valve assembly.

2. In a valve assembly, comprising,
a hollow inlet member having a seat end which is externally threaded; and
a rotatable closure member having means for engaging the seat end of said hollow member to close it against material flow therethrough, said closure member threadably engaging said seat end, said closure member having jet openings formed therein, said openings being in communication with the seat end of said hollow member when said seat end is open, each of said openings having an axis being disposed in an plane extending at an angle to the radial lines of said closure member and at an angle to the longitudinal axis of said closure member, the transverse projection of the axis of each opening being a line spaced from the longitudinal axis of the closure member, said jet openings being so arranged that material flowing out through said jet openings produce a reverse circumferential thrust causing said closure member to rotate, and the direction of said reverse thrust being the same as the direction in which the closure member is turned to bring the means into engagement with the seat end of said hollow member.

3. In a valve assembly, comprising,
a hollow inlet member having a seat end which is externally threaded; and
a closure member having means for engaging the seat end of said hollow member to close it against material flow therethrough, said closure member threadably engaging said seat end, said closure member having jet openings formed therein, said openings being in communication with the seat end of said hollow member when said seat end is open each of said openings having an axis being disposed in a plane extending at an angle to the radial lines of said closure member and at an angle to its longitudinal axis, said jet openings being further defined as arranged in a plane extending at an angle to the transverse plane through said closure member, said transverse plane being normal to the longitudinal axis of said closure member, the transverse projection of the axis of each opening being a line spaced from the longitudinal axis of the closure member, said jet openings extending in a direction such that the reverse circumferential thrust produced as material flows through said openings is to cause said closure member to rotate in the same direction as the closure member is turned to bring the means into engagement with the seat of said hollow member.

4. In a valve assembly, comprising,
a hollow inlet member having a seat end which is externally threaded; and
a rotatable closure member having means for engaging the seat end of said hollow member to close it against material flow therethrough, said closure member having a cylindrical wall internally threaded for engagement with said externally threaded seat member, said cylindrical wall terminating adjacent said seat engaging means in a uniformly inwardly tapering wall portion; and jet openings formed in said closure member at the juncture of said cylindrical wall and said tapered wall, said jet openings having an axis being disposed in a plane extending at an angle to the radial lines of said closure member and at an angle to the longitudinal axis of said closure member, the transverse projection of the axis of each opening being a line spaced from the longitudinal axis of the closure member, said jet openings extending in a direction along the longitudinal axis of said closure member but in a plane at an angle to the transverse plane through said closure member such that the reverse circumferential thrust produced as material flows through said openings as to cause said closure member to rotate in the same direction as the closure member is turned to bring the means into engagement with the seat of the hollow member.

5. The structure of claim 4 and said valve assembly further includes a cylindrical in cross-section outlet conduit and said closure member is positioned in said outlet conduit with said closure member having an outer cylindrical surface disposed closely adjacent the inside cylindrical surface of said outlet conduit and with said tapering wall portion of said closure member tapering inwardly away from the cylindrical surface of said outlet conduit, and the jet openings in the wall of said closure member each having a portion of the opening formed in the outer face of the tapered wall portion which is spaced inwardly from said inside cylindrical surface of said outlet conduit.

References Cited by the Examiner
UNITED STATES PATENTS

| 799,732 | 9/05 | Harsen | 137—243 |
| 2,652,224 | 9/53 | Noland | 251—217 X |

M. CARY NELSON, *Primary Examiner.*